United States Patent Office 3,034,994
Patented May 15, 1962

3,034,994
CATALYSTS AND PROCESS FOR THE PREPARATION THEREOF
David G. Braithwaite, Chicago, Edwin H. McGrew, Riverside, William P. Hettinger, Jr., Dalton, and Joseph S. D'Amico, Westchester, Ill., assignors to Nalco Chemical Company, a corporation of Delaware
No Drawing. Filed Feb. 6, 1958, Ser. No. 713,520
5 Claims. (Cl. 252—453)

This invention relates to catalysts which are suitable for use in cracking petroleum hydrocarbons and to a new and improved method for the preparation of such catalysts. More particularly, the invention is concerned with the utilization of both synthetic silica-alumina compositions and silica-alumina compositions derived from natural sources in the preparation of a new and useful catalyst.

The use of synthetic silica-alumina compositions as cracking catalysts is well known. Certain types of clay catalysts, such as acid activated montmorillonite, have also been used in the cracking of petroleum hydrocarbons.

In general, catalytic cracking processes may be described as (1) fixed bed processes, (2) moving bed processes, or (3) fluid bed processes. In the fixed bed processes the catalyst particles are placed in a column and the gases or vapors to be cracked are passed therethrough. In the fluid bed processes, known as "fluidized cracking," the catalyst particles remain suspended in the gas or vapor stream and are maintained in a fluidized state.

In fixed and moving bed cracking, macrosized particles in the form of pellets or tablets are often used and these particles are subjected to stresses from the weight of the catalyst disposed above them and the pressures used in the process. These macrosized particles, therefore, must be physically strong and resistant to attrition.

In the fluidized cracking processes, the catalyst particles are preferably used in the form of microspheres which are sufficiently fine to pass through a 100 mesh screen and preferably have a particle size within the range of 20 to 120 microns. Since the catalyst particles are maintained in a fluidized state, the movement of the particles creates an attrition problem. Synthetic silica-alumina microspheres have been found to be especially useful in fluidized cracking but they are extremely hard and have brittle properties similar to glass so that there is a tendency for such catalyst particles to be broken into finer particles as a result of the constant agitation in the fluidized cracking process. Extremely fine particles which are produced in this manner are sometimes lost from the cracking unit with regenerator stack gases and such loss must be replaced by the addition of fresh catalyst.

The catalysts derived from natural sources have an economic advantage due to the fact that the raw material costs are less but these natural raw materials leave much to be desired in the preparation of microspheres suitable for use in fluidized cracking processes. Furthermore, their physical properties are not all that may be desired, even in fixed bed catalytic processes.

One of the objects of the present invention is to provide new silica-alumina compositions containing both synthetic silica-alumina and silica-alumina derived from natural sources.

Another object of the invention is to provide new and improved catalysts of the silica-alumina type which are suitable for use in fluidized cracking processes and are less subject to loss by attrition than presently available synthetic silica-alumina catalysts.

Another object of the invention is to provide new and improved silica-alumina catalysts which are suitable for use in fixed bed catalytic processes.

Still a further object of the invention is to provide catalysts containing both synthetic silica-alumina and certain types of clay incorporated into the catalyst during its manufacture so as to be in intimate physical combination with the synthetic silica-alumina composition.

Another object of the invention is to provide a new and improved process for the manufacture of a silica-alumina catalyst wherein a certain type of clay is incorporated into a synthetic silica-alumina hydrogel prior to drying thereof so that the clay particles are combined with the synthetic silica-alumina hydrogel particles.

An additional object of the invention is to provide a process for the manufacture of catalysts wherein a silica-alumina material derived from natural sources is intimately dispersed with a reactant used in preparing a synthetic silica-alumina hydrogel prior to the formation of the hydrogel.

Another object of the invention is to provide a new and improved process of manufacturing compositions consisting essentially of silica and alumina wherein the end product consists of microspherical particles made up of silica and alumina derived both from synthetic and natural sources. Other objets will appear hereinafter.

These objects are accomplished in accordance with this invention by incorporating a kaolinitic clay into a synthetic silica-alumina hydrogel prior to drying of the latter. For the purpose of the invention, the kind, particle size and amount of the clay employed, are important.

The kaolinitic clay used in the practice of the invention contains about two mols of $SiO_2$ per mol of $Al_2O_3$. It has a crystalline structure which is planar and hexagonal. The average longest dimension of the hexagonal particles varies within the range of 0.1 to 20 microns and the particles are relatively thin, the thickness usually being less than one-tenth of the longest dimension.

Kaolinites of this type are found particularly in Georgia and also in other parts of the United States. The kaolinite crystals are prepared for use in the present invention by conventional methods which involve such well known steps as blunging with water, adding a polyphosphate such as sodium hexametaphosphate to keep the clay in suspension, screening out quartz, centrifuging, washing with sulfuric acid, for example at a pH of 3.5, bleaching and flocculating with small amounts of various types of flocculants such as alum, filtering, drying and grinding. Iron and titanium are often present in natural clays, e.g., as ilmenite, and a large part of this is removed during the centrifuging.

The clays used in the practice of this invention are preferably high purity clays containing not more than 2% by weight of iron as $Fe_2O_3$. The presence of iron in a catalyst tends to produce hydrogen formation during cracking and if the iron content of the clay exceeds about 2% by weight it is desirable to leach the clay with an inorganic acid prior to use in the practice of the invention in order to reduce the iron content below 2% by weight as $Fe_2O_3$ and render the clay more suitable for use as ingredient in a cracking catalyst. For some purposes, of course, the presence of the iron in the resultant composition may not be objectionable.

In addition to having an iron content within the limits specified, it is beneficial if the clay contains amounts of particles having colloidal fineness. Thus, kaolinites having at least 10% by weight of one micron or less sized particles are preferred. The greater the percentage of colloidal particles in a given clay the more desirable it is for use in catalyst manufacture. Fne particle clays may be obtained using known sedimentation-fractionation techniques. While clay of colloidal fineness are preferred, those clays having substantial quantities of particles in excess of five microns have proven useful in the practice of the invention.

Kaolinites are usually segregated into particle size ranges, such as for example by centrifuging, air floating or settling. Two commercially available products, "premax" and "hydrite" are examples of fine and coarse grades of clay. "Premax" has a particle size such that 10% by weight is less than 0.2 micron, 50% by weight less than 0.6 micron, and 90% by weight less than 1.6 microns. "Hydrite" is typical of a coarse clay. Its particle size distribution will have about 10% by weight of the particles less than 0.6 micron, 50% by weight less than 5.2 microns, and 90% by weight less than 20 microns. The above descriptions are illustrative only and are not intended as being limitations.

For the purpose of the invention it has been found that clays of the type previously described can be combined with synthetic silica-alumina hydrogels in proportions such that the resultant silica-alumina compositions contain 20% to 85% by weight of clay particles. For optimum results the relative proportions of clay particles are preferably within the range from 30% to 75% by weight of the total composition and excellent results have been obtained with compositions containing approximately equal parts by weight of clay and synthetically derived silica-alumina.

The synthetically derived silica-alumina should contain 55% to 95% by weight of silica ($SiO_2$) and 5% to 45% by weight of alumina ($Al_2O_3$).

Various processes may be used in preparing the synthetic silica-alumina. One type of process involves gelling an alkali metal silicate with an inorganic acid while maintaining the pH on the alkaline side. An aqueous solution of an acidic alumina salt is then intimately mixed with the silica hydrogel so that the aluminum salt solution fills the silica hydrogel pores. The aluminum is thereafter precipitated as a hydrous alumina by the addition of an alkaline compound. As a specific example of this method of preparation a silica hydrogel is prepared by adding sulfuric acid or hydrochloric acid under vigorous agitation and controlled temperature and concentration conditions to a sodium silicate solution. Aluminum sulfate or aluminum chloride solution in water is then added to the silica hydrogel with vigorous agitation to fill the gel pores with the aluminum salt solution. An ammonia solution is then added to the gel with vogorous agitation to precipitate the aluminum as hydrous alumina in the pores of the silica hydrogel, after which the hydrous gel is processed, for instance, by separating a part of the water on vacuum filters and then drying, preferably spray drying. The dried product is then washed to remove sodium and sulfate ions, either with water or very weak acid solution, after which the resultant product is dried to a low moisture content, usually less than 25% by weight, e.g., 10% to 20% by weight to provide the finished catalyst.

In another type of process which is preferably used for the practice of this invention the silica is precipitated from an aqueous alkali metal silicate solution by adding an aqueous solution of an acid thereto, preferably an aqueous solution of a mineral acid, such as sulfuric acid or hydrochloric acid, having a concentration sufficiently low so as to avoid locallized reaction and substantial heat generation during the addition of the aqueous acid solution. The quantity of the aqueous acid solution added to the alkaline aqueous silicate solution is sufficient to precipitate silicate as a hydrogel and to lower the pH of the resultant solution, preferably until the solution is still mildly alkaline (pH about 8 to 10.5), although, if desired, the pH can be reduced to as low as about 5.

An aqueous solution of an alkaline aluminum salt in which the alumium exists in the anion, such as, for example, sodium aluminate, potassium aluminate, or calcium aluminate, is then added to the hydrogel, increasing the pH slightly and precipitating alumina in hydrous form. An acidic aqueous solution of aluminum salt in which aluminum is present in the cation only, such as, for example, aluminum chloride or, preferably, aluminum sulfate, is then added to the gel slurry to lower the pH of the resultant slurry preferably to a pH of about 4.5 to 5. In this step, the silica hydrogel is impregnated with further quantities of alumina in hydrous form. The concentration of the aqueous solution of the aforesaid aluminum salt in which aluminum exists in the cation is preferably adjusted such that the weight ratio of water to the salt, expressed as $Na_2Al_2O_4$, is at least 7.5–1 and preferably 15 to 1 or more. The volume dilution of the sodium, potassium, or calcium aluminate solution is usually at least 5:1 and preferably around 10:1. More dilute solutions can be used but do not substantially improve the resulting products and tend to create additional problems in removing water from the final product. While catalysts obtained by using relatively concentrated aluminum salt solutions are useful, in practice it has been shown that alumina precipitated from a concentrated aluminum salt solution is not the same as alumina precipitated from more dilute aluminum salt solutions and that the resultant compositions derived by the employment of dilute aluminum salt solutions are more desirable as catalysts in catalytic processes, especially in catalytic processes for crackiing of petroleum hydrocarbons.

The resulting silica hydrogel slurry containing alumina in hydrous form then is filtered to increase total solids concentration to an excess of 8% by weight of the composition. The filtration step is optional in some instances, but it is an important step where it is desired to produce microspheres having a particle size within the range of 20 to 100 microns, a desirable particle size for fluidized catalysts. The filtering step also effects a substantial purification of the gel by the removal of dissolved salts and enhances the formation of a continuous phase in the microspheric particles ultimately formed. If the slurry is filtered and it is desired to spray dry the filter cake, the latter should be reslurried with enough water to produce a pumpable mixture. The spray dried product is then washed and given a final drying in the manner previously recited.

The foregoing constitutes a relatively detailed description of two methods by which alumina in hydrous form is incorporated into a silica gel and the resulting gel further processed to produce small miscrospheres suitable for use in catalytic processes. It will be understood that it is not in the interest of time and space to point out all possible variations and ramifications by which similar products can be produced. It will be understood, therefore, that the invention herein described and claimed is applicable to processes other than those herein described in detail wherein similar products are produced. In any process used for the purpose of the present invention, it is preferred that the relative proportions of the silica to alumina be between 55–95% by weight of silica and 5–45% by weight of alumina on a dry basis, that is, without taking into consideration the water present in the gel structure of the silica and alumina. The temperature of the reaction mixture is subject to variation, being preferably within the range of 40° F. to 140° F. in each of the various stages of the process. It will be further recognized that the silica-alumina compositions herein described may be employed per se or in association with other oxides, including, for example, zirconia, titania, thoria, chromium oxides and/or boron oxides.

Macrosize particles are formed from smaller particle sizes and may be prepared according to the processes previously described. One method for providing strong macrosize particles is by making tablets from smaller catalyst particles as the manufacturer can to some degree regulate the strength of the product by varying the tabletting pressure. A difficult associated with tabletting is that the resulting catalyst particles frequently are of low porosity, due primarily to the pressure employed in shaping. Since catalytic efficiency is a function of porosity, due to the greater chemical activity exhibited when the feed to be reacted can enter the pores of the catalyst particles and the products obtained can exit the pores with ease, it is apparent that decreased porosity can lower the effectiveness of the catalyst. Thus, it is desirable to provide macrosize particles which are fairly strong and of satisfactory porosity.

Another method for preparing macrosize porous catalyst particles is by extrusion. In this procedure the catalyst material, e.g., small particle form silica-alumina hydrate, in admixture with free water is forced through small holes to form continuous streams of extruded material which is broken or cut into shorter lengths approaching the individual stream diameter. The material extruded is sufficiently hard to assume a definite shape yet it must have enough free moisture so that it issues from the holes continuously and does not crumble and fall apart.

A preferred process for incorporating the clay with the synthetic silica-alumina composition is to first intimately disperse or peptize the clay into the silicate solution prior to the formation of the silica hydrogel. Another method of combining the clay with the synthetic silica-alumina hydrogel is to intimately admix the peptized clay slurry to a preformed silica-alumina hydrogel. The sodium silicate acts as a peptizing agent to disperse the flat clay crystals and when the silica hydrogel is precipitated these crystals are uniformly distributed throughout the composition. Since kaolinite contains approximately equal atomic ratios of silicon (Si) and aluminum (Al), the relationship of the silicon and aluminum in the clay portion of the catalyst may be regarded as Si–Al–Si–Al, and so on, and this relationship is retained after the formation of the silica hydrogel and after the impregnation of the silica hydrogel with the alumina hydrogel as evidenced by electron microphotographs.

In general, where it is desired to prepare microspherical particles the attrition characteristics of the particles tend to deteriorate if the quantity of clay based on the weight of the total composition exceeds 75% and there is no practical value to adding the clay if the quantity is less than 20% by weight. Where the final composition is prepared in a different type of physical form, such as pellets or an extruded composition, the quantity of clay may be somewhat higher but 85% by weight represents the maximum in any case. The general weight ratio of clay to hydrogel is preferably 1:4 to 4:1 and the optimum range is 1:1 to 2:1.

Typical synthetic silica-alumina compositions which have been tested in the practice of the invention are (1) a low alumina composition containing 13% by weight of alumina and 87% silica, and (2) a high alumina composition containing 25% by weight $Al_2O_3$ and 75% by weight $SiO_2$. These compositions when combined with a natural clay in the manner previously described both give very effective catalysts. Especially good results have been obtained with the high alumina composition combined with clay of the type and in the manner previously described in approximately equal weight proportions.

The invention will be further illustrated but is not limited by the following examples in which the quantities are stated in parts by weight unless otherwise indicated.

EXAMPLE I

On a plant scale, 3100 gallons of hot water and 3030 pounds of Snowbrite clay, containing 86.0% solids, were mixed and the slurry was heated with a steam coil over a period of 30 minutes, 51 gallons of 66° Bé. sulfuric acid (780 pounds) was added to the heated slurry. The amount of acid added was equal to 0.3 pound of acid per pound of clay. After the acid addition was completed, the mixture was cooked for 75 minutes, the temperature rising from an initial temperature of 90° F. to a final temperature of 142° F.

After the cooking period, additional water was added to the slurry and the material was thoroughly mixed. A small amount of a coagulant was added to the batch, and the clay was allowed to settle. The clear liquid was siphoned off, and the tank was again filled with water. This water was then siphoned off. Samples of the two decantations were analyzed for Fe, showing 0.005 gram per liter Fe in the liquid of the first decantation and 0.001 gram per liter Fe in the liquid of the second decantation.

To the washed slurry was added 575 gallons of sodium silicate solution containing 28.6% $SiO_2$. This solution was mixed well with the clay slurry and the mixture was heated to 90° F. then, 202 gallons of 35% sulfuric acid was added over a period of 37 minutes. Gelation occurred after 33 minutes of acid addition.

Thereafter, 382 gallons of alum solution (7.8% $Al_2O_3$) was added over a period of 20 minutes. Then, 100 gallons of sodium aluminate containing 23.6% $Al_2O_3$ was added over a period of 8½ minutes. During the same 8½ minute addition period, dilution water was added at the rate of 40 gallons per minute. The final batch had a pH of 5.3 at a temperature of 86° F.

The batch was then pumped out of the reaction vessel and filtered on drum filters. The recovered filter cake had a solids content of 18.28%. The filter cake was then spray dried in a current of hot air. The nozzle sizes on the spray drying apparatus were 0.10 and 0.12 inch, and the pressure of the nozzles was 2500 and 2000 p.s.i., respectively. The temperature of the exit solids from the spray drying apparatus was 190° F. The resulting spray drying microspheres were screened. Two percent did not pass a 200 mesh screen, and 66% passed a 325 mesh screen.

The spray dried microspheres were then washed with sulfuric acid solution (80 grains of $H_2SO_4$ per gallon of aqueous solution) to remove sodium ions and with aqueous ammonia to remove the sulfate ions. Thereafter, the solids were washed with water. The average of 11 checks on the sodium and sulfate content was $Na_2O$—0.012%, $SO_4$—0.51%.

The washed solids were then flash dried. The outlet temperature of the solids from the flash drying apparatus was 300° F.

The catalyst, on a dry basis, had an aluminum content, expressed as $Al_2O_3$, of 37.2%, 0.043% Na, expressed as $Na_2O$, an $SO_4$= content of 0.4%, and 0.41% Fe, the remainder being substantially all $SiO_2$. The catalyst had a surface area of 234 square meters per gram, a pore volume of 0.59 cc./gm. and a pore diameter of 102 A. In cracking evaluations, it had an initial apparent bulk density of 0.43 gm./cc. and an apparent bulk density after steaming at 60 p.s.i. of 0.49 gm./cc.

In the foregoing example the synthetically derived silica-alumina contained approximately 75% by weight $SiO_2$ and 25% by weight $Al_2O_3$. The weight ratio of the clay to the synthetic silica-alumina was approximately 1:1. The resultant microspheres had satisfactory properties whereas the clay alone cannot be spray dried to give acceptable microspheres.

EXAMPLE II

In a batch process, 4850 pounds of "Snowbrite" clay (0.87% Fe) containing 86.0% solids was added to 4650 gallons of hot water at 90° F. The mixture was agitated to form a uniform clay slurry.

To the slurry was added 920 gallons of sodium silicate solution containing 28.6% $SiO_2$. The material was mixed well and heated to 88° F. Then 324 gallons of 35% sulfuric acid was added over a period of 50 minutes. The mixture gelled after 37 minutes.

To the gel was added in a period of 35 minutes, 610 gallons of aluminum sulfate solution (7.8% $Al_2O_3$) with mixing. While continuing mixing, 190 gallons of sodium aluminate solution (23.6% $Al_2O_3$) was added in a period of 19 minutes. During the same 19 minute addition period, dilution water was added at the rate of 40 gallons per minute. The final batch had a pH of 5.3 and a final temperature of 101° F.

The material was then filtered on a drum filter. The filter cake had a solids content of 19.0%. The filter cake was then spray dried on a spray drying apparatus having a nozzle size of 0.12 inch. The spraying pressure was between 1900 and 1950 p.s.i. The exit temperature of the dried solids was 190° F. An average of 45% of the spray dried microspheres would not pass through a 200 mesh screen and an average of 19% of said solids passed through a 325 mesh screen.

The spray dried microspheres were then purified by washing with dilute sulfuric acid, aqueous ammonia and water. The average of three checks on sodium sulfate content in the wash water was $Na_2O$—0.007%, $SO_4$—0.84%.

The washed microspheres were then flash dried. The outlet temperature of the solids was 250° F. The solids had a moisture content of 23.6%.

The catalyst, on a dry basis, had an aluminum content, expressed as $Al_2O_3$, of 47.0%, a sodium content of 0.038%, expressed as $Na_2O$, and $SO_4^=$ content of 1.1%, and an Fe content of 0.43%, the remainder being substantially all $SiO_2$. The catalyst had a surface area of 261 square meters per gram, a pore volume of 0.62 cc./gm. and a pore diameter of 95 A.

EXAMPLE III

In another batch, the procedure outlined in Example II was repeated with similar proportions of chemicals with the exception that the quantity of clay used was calculated to yield a catalyst containing 75% clay.

The catalyst, on a dry basis, had an aluminum content, expressed as $Al_2O_3$, of 37.7%, 0.067% Na, expressed as $Na_2O$, about 0.1% $SO_4^=$, and 0.67% Fe, the remainder being substantially all $SiO_2$. It had an initial apparent bulk density of 0.56 gm./cc., and an apparent bulk density after 60 p.s.i. steaming of 0.58 gm./cc.

EXAMPLE IV

This example is intended to illustrate the preparation of a catalyst in which the ratio of synthetic silica to synthetic alumina is approximately 87:13. Nine pounds of "Snowbrite" clay was suspended in 10 gallons of water and 2 gallons of sodium silicate solution containing 28.6% $SiO_2$ were mixed with the clay during a period of 1 hour at a temperature of about 88° F. A solution of 0.71 gallon of 35% sulfuric acid was then added together with 0.642 gallon of an alum solution containing 7.8% $Al_2O_3$ in a period of 35 minutes. A solution of 0.165 gallon of sodium aluminate containing 23.6% $Al_2O_3$ in water was mixed with an additional quantity of 0.66 gallon of water. The sodium aluminate solution was added to the previously prepared mixture to a final pH of 5.5 to 6.0 and the resultant composition was further processed to produce microspheres as in Example I.

EXAMPLE V

The procedure was the same as in Example II except that "hydrite" clay was substituted for the "Snowbrite" clay. The catalyst contained, on a dry basis, 31.1% $Al_2O_3$, 0.045% $Na_2O$, less than 0.20% Fe, as $Fe_2O_3$, less than 0.1% $SO_4$, and the remainder substantially all $SiO_2$. The initial volume activity was 67 and after steaming the volume activity was 44. The initial weight activity was 58 and after steaming, the weight activity was 36. The apparent bulk density was .58 before steaming and .61 after steaming.

One method of evaluating cracking catalysts is to determine the relative "activity" of the catalyst. For example, to determine activity, a Mid-Continent gas oil fraction having an API gravity of 32.3°, an initial boiling point of 536° F., an end boiling point of 734° F. and containing .35% sulfur is passed at atmospheric pressure at 900° F. over a solid bed of the catalyst contained in a furnace at a space velocity of said gas oil of approximately four volumes per volume of catalyst per hour (4 v.h.s.v.). The liquid hydrocarbon product is fractionated and the part boiling at a temperature below 400° F. is condensed in a suitable receiver and represents the gasoline fraction. A sample of primary standard catalyst (100 volume activity rate by definition) is processed at 2, 4 and 8 v.h.s.v. to obtain conversion of gas and gasoline. These conversions are plotted against reciprocal space velocity to obtain a standard calibration curve. Any point on such curve represents 100 volume activity rating. All unknown samples are processed under the above described conditions at 4 v.h.s.v. The volume activity of such unknown is 100 times the ratio of space velocities of the unknown and standard required to obtain the same conversion levels. From the data on the unknown, the calibration line and the apparent bulk density, both the volume activity and the weight activity of the unknown are readily calculated.

Where the catalyst is given no pretreatment, the activity is usually referred to as "initial activity." Where the catalyst is pretreated by steaming under 60 pounds steam pressure at 1200° F. for 16 hours, the activity is referred to as "activity after steaming." In general, with any given catalyst the initial activity will be higher than the activity after steaming. The activity after steaming is of more practical value in evaluating the catalyst.

The distribution of the products obtained is also a factor in determining the value of the catalyst.

The catalyst of Example I had an initial volume activity of 63, an initial weight activity of 73, a volume activity after steaming of 44 and a weight activity after steaming of 45. This catalyst had an apparent bulk density of .43 before steaming and .49 after steaming.

The catalyst prepared as described in Example II had an initial volume activity of 89.5 and a weight activity of 78. The volume activity after steaming was 45 and the weight activity after steaming was 37.1. This catalyst had an apparent bulk density of .58 before steaming and .61 after steaming.

The catalyst of Example III had an initial volume activity of 47 and a volume activity after steaming of 45. It had a weight activity of 41 and a weight activity after steaming of 30. Its apparent bulk density before steaming was .56 and after steaming .58.

The catalyst of Example IV had an initial volume activity of 66 and a volume activity after steaming of 36. It had an initial weight activity of 51 and a weight activity after steaming of 28. Its apparent bulk density was .64 before steaming and .66 after steaming.

These results indicate that all of these catalysts can be used successfully in catalytic cracking processes.

The following table shows the product distribution of products obtained by a Mid-Continent gas oil of the type previously described by continuously cycling the oil over the catalysts of Examples I and II at atmospheric pressure and at 900° F. over a 15 minute period, at various conversion rates.

*Table I*

|  | Catalyst | | |
| --- | --- | --- | --- |
|  | Example I [1] | Example II | Example II [1] |
| 1. Conversion_____percent__ | 37.9 | 31.8 | 60.6 |
| 2. Total Product recovered_____do__ | 98.5 | 99.2 | 96.5 |
| 3. Hydrogen gas, c.f./bbl. oil_____ | 46.3 | 25.1 | 117 |
| 4. C₃-fraction gases: | | | |
| (a) c.f./bbl. oil_____ | 193 | 117 | 366 |
| (b) Weight basis_____percent__ | 4.79 | 2.95 | 7.25 |
| 5. C₄-fraction: | | | |
| (a) Volume basis_____do__ | 10.2 | 8.55 | 10.4 |
| (b) Weight basis_____do__ | 6.85 | 5.76 | 7.03 |
| 6. Gasoline: | | | |
| (a) Volume basis_____do__ | 29.2 | 26.2 | 47.0 |
| (b) Weight basis_____do__ | 23.4 | 22.9 | 42.5 |
| 7. Coke, weight basis_____do__ | 0.92 | 1.1 | 3.04 |

[1] Catalyst steamed at 60 p.s.i.

The conversion value is determined by the difference between the weight of oil charged less the weight of the cycle stock divided by the weight of the oil charge, times 100 where the cycle stock is the fraction having a boiling point in excess of 400° F. The C₃-fraction is a fraction of gases comprising three carbon atoms and lighter gases and includes such gases as propane, propylene, ethane, ethylene, methane, etc. The C₄-fraction comprises the four carbon hydrocarbons such as n-butane, isobutane, butylene, etc., and is measured on a volume basis in liquefied form. The gasoline range covers hydrocarbons ranging from five carbons to those having boiling points up to 400° F.

In the foregoing examples the "Snowbrite" clay was a Georgia kaolinite containing on a dry basis approximately 37.2% by weight $Al_2O_3$, 0.43% by weight $Na_2O$, 0.4% by weight $SO_4$, 0.41% by weight Fe and the remainder $SiO_2$. Another particularly suitable clay is known as KCS. This clay has a similar chemical analysis and a similar crystal structure. The particle size is such that 10% by weight is less than 0.26 micron, 30% by weight is less than .5 micron, 50% by weight is less than 0.9 micron, 80% by weight is less than 2 microns, 90% by weight is less than 3.5 microns, and 95% by weight is less than 4.5 microns.

In connection with the product distribution tests reported in Table I, it will be understood that different conversion rates are obtained by varying the space velocities (volume of gas oil to weight of catalyst). Thus, the conversion rate of 37.9% was obtained with 150 cc. of gas oil per 250 grams of catalyst; the conversion rate of 31.8% was obtained with 150 cc. of gas oil per 100 grams of catalyst containing 16% moisture (168 g. on a dry basis); and the conversion rate of 60.6% was obtained with 475 g. of catalyst. All runs were at 900° F. for 15 minutes.

The catalysts prepared in accordance with the invention have satisfactory activities and are more economical to manufacture than synthetic silica-alumina catalysts. It could not be foreseen that such large amounts of a clay could be added to the synthetic silica-alumina composition while still retaining satisfactory catalytic activity. Within certain limits, as previously discussed, a clay of the type described also improves the attrition characteristics of microspheres made from the compositions of the invention. Furthermore, the microspheres can be prepared by spray drying which is an important advantage of synthetic catalysts not generally applicable to catalysts derived from natural sources. The invention provides catalysts of very acceptable stabilities.

The invention is hereby claimed as follows:

1. A composition suitable for use as a catalyst in fluidized bed catalytic cracking processes consisting essentially of spray-dried microspherical particles having average diameters within the range of 20–120 microns which are composed essentially of synthetic silica and alumina hydrogels with kaolinitic clay particles having a hexagonal crystal structure in the form of thin plates embodied in the hydrogel structure, said clay having at least 10% by weight colloidal particles and a major proportion of its particles being substantially within the range of 0.1 micron to 20 microns as the largest dimensions and said clay containing not more than about 2% of iron, expressed as $Fe_2O_3$, the quantity of silica hydrogel on a dry basis being within the range of 55–95% by weight of the total hydrogel content of the composition and the quantity of alumina hydrogel on a dry basis being within the range of 45–5% by weight of the total hydrogel on a dry basis, the quantity of said kaolinitic clay being within the range of 20–75% by weight of the total composition on a dry basis.

2. A composition as claimed in claim 1 in which the weight ratio of clay to hydrogels is in the range of approximately 1:1 to 2:1.

3. A composition suitable for use as a catalyst in fluidized bed catalytic cracking processes comprising spray-dried microspherical particles having an average diameter within the range of 20–120 microns, which particles comprise synthetic silica and alumina hydrogels containing in the hydrogel structure a kaolinitic clay having a hexagonal crystal structure in the form of thin plates, said clay having at least 10% by weight of particles which are one micron or less with a major portion of the clay particles being substantially within the range of 0.1–20 microns as the largest dimension, the quantity of silica hydrogel on a dry basis being within the range of 55–95% by weight of the total hydrogel content of the composition and the quantity of alumina hydrogel on a dry basis being within the range of 45–5% by weight of the total hydrogel on a dry basis, the quantity of said kaolinitic clay being within the range of 30–75% by weight of the total composition on a dry basis.

4. A composition suitable for use as a catalyst in fluidized bed catalytic cracking processes consisting esesntially of spray-dried microspherical particles having average diameters within the range of 20–120 microns which are composed essentially of synthetic silica-alumina hydrogel with particles of a kaolinite clay embodied in said hydrogel, said clay having at least 10% by weight colloidal particles and a major proportion of its particles being substantially within the range of 0.1 micron to 20 microns as the largest dimension and said clay containing not more than about 2% of iron, expressed as $Fe_2O_3$, the quantity of silica hydrogel on a dry basis being within the range of 55–95% by weight of the total hydrogel content of the composition and the quantity of alumina hydrogel on a dry basis being within the range of 45–5% by weight of the total hydrogel on a dry basis, the quantity of said kaolinite clay being within the range of 20–75% by weight of the total composition on a dry basis.

5. A process for the manufacture of silica-alumina catalysts, which comprises adding to a sodium silicate solution having dispersed therein kaolinitic clay having a hexagonal crystal structure in the form of thin plates, said clay having at least 10% by weight of particles of one micron or less with a major portion of the particles being substantially within the range of 0.1 micron to 20 microns as the largest dimension dispersed therein, sulfuric acid in an amount sufficient to gel the silicate, adding to the gelled mixture both aluminum sulfate and sodium aluminate, filtering the resulting slurry, and spray drying the filter cake into microspherical particles having an average diameter in the range of 20–120 microns, the clay constituting 20% to 75% by weight of the solids in the dried catalyst and the quantity of silica hydrogel on a dry basis being within the range of 55–95% by weight of the total hydrogel content of the catalyst and the quantity of alumina hydrogel on a dry basis being within the range of 45–5% by weight of the total hydrogel.

References Cited in the file of this patent

UNITED STATES PATENTS

| | | |
|---|---|---|
| 2,374,313 | Veltman | Apr. 24, 1945 |
| 2,423,850 | Peery | July 15, 1947 |
| 2,428,257 | Ahlber et al. | Sept. 30, 1947 |
| 2,481,841 | Hemminger | Sept. 13, 1949 |
| 2,487,065 | Milliken | Nov. 8, 1949 |
| 2,535,948 | Nicholson et al. | Dec. 26, 1950 |
| 2,644,516 | Brendel | July 7, 1953 |
| 2,669,547 | Shabaker | Feb. 16, 1954 |
| 2,727,868 | Simpson et al. | Dec. 20, 1955 |
| 2,763,622 | Plank et al. | Sept. 18, 1956 |